United States Patent
Kreiner et al.

(10) Patent No.: US 10,950,073 B2
(45) Date of Patent: *Mar. 16, 2021

(54) VIDEO RECORDER

(71) Applicant: Chanyu Holdings, LLC, Wilmington, DE (US)

(72) Inventors: Barrett Morris Kreiner, Norcross, GA (US); Joseph E. Page, Jr., Suwanee, GA (US)

(73) Assignee: Chanyu Holdings, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/786,648

(22) Filed: Feb. 10, 2020

(65) Prior Publication Data
US 2020/0175790 A1    Jun. 4, 2020

Related U.S. Application Data

(63) Continuation of application No. 16/025,926, filed on Jul. 2, 2018, now Pat. No. 10,559,141, which is a continuation of application No. 15/941,633, filed on Mar. 30, 2018, now abandoned, which is a continuation of application No. 12/632,943, filed on Dec. 8, 2009, now Pat. No. 9,934,628, which is a
(Continued)

(51) Int. Cl.
| | |
|---|---|
| G07C 5/08 | (2006.01) |
| G08B 13/196 | (2006.01) |
| H04N 5/76 | (2006.01) |
| H04N 5/765 | (2006.01) |
| H04N 5/781 | (2006.01) |
| H04N 5/85 | (2006.01) |
| H04N 5/907 | (2006.01) |
| H04N 5/92 | (2006.01) |

(52) U.S. Cl.
CPC ..... *G07C 5/0858* (2013.01); *G08B 13/19647* (2013.01); *G08B 13/19669* (2013.01); *G08B 13/19671* (2013.01); *G08B 13/19676* (2013.01); *H04N 5/76* (2013.01); *H04N 5/765* (2013.01); *H04N 5/781* (2013.01); *H04N 5/85* (2013.01); *H04N 5/907* (2013.01); *H04N 5/9201* (2013.01)

(58) Field of Classification Search
CPC ............ G07C 5/0858; G08B 13/19669; G08B 13/19676; G08B 13/19647; G08B 13/19671; H04N 5/76; H04N 5/85; H04N 5/765; H04N 5/907; H04N 5/9201; H04N 5/781
USPC ........................................................ 348/143
See application file for complete search history.

(56) References Cited

U.S. PATENT DOCUMENTS

| | | |
|---|---|---|
| 5,144,661 A | 9/1992 | Shamosh et al. |
| 5,301,240 A | 4/1994 | Stockum et al. |

(Continued)

*Primary Examiner* — Allen C Wong
(74) *Attorney, Agent, or Firm* — Kowert, Hood, Munyon, Rankin & Goetzel, P.C.

(57) ABSTRACT

Methods and apparatuses are disclosed for recording video data of an event. The apparatuses include a processor communicating with memory. The memory stores video data of the event captured by a camera, and the video data includes a series of picture frames of the event. A loop buffer also stores video data of the event captured by the camera. A rule-based engine stored in the memory uses a set of rules to store the contents of the loop buffer in the memory. The apparatus utilizes the loop buffer to provide video data prior to occurrence of the event.

20 Claims, 4 Drawing Sheets

Related U.S. Application Data continuation of application No. 10/674,770, filed on Sep. 30, 2003, now Pat. No. 7,667,731.

(56) References Cited

U.S. PATENT DOCUMENTS

| | | | |
|---|---|---|---|
| 5,402,167 A | 3/1995 | Einbinder | |
| 5,432,871 A | 7/1995 | Novik | |
| 5,724,475 A | 3/1998 | Kirsten | |
| 6,163,338 A * | 12/2000 | Johnson | H04N 7/188 348/143 |
| 6,167,186 A | 12/2000 | Kawasaki et al. | |
| 6,225,890 B1 | 5/2001 | Murphy | |
| 6,272,253 B1 | 8/2001 | Bannon et al. | |
| 6,330,025 B1 | 12/2001 | Arazi et al. | |
| 6,356,664 B1 | 3/2002 | Dunn et al. | |
| 6,393,163 B1 | 5/2002 | Burt et al. | |
| 6,428,059 B2 | 8/2002 | Kobayashi et al. | |
| 6,456,321 B1 | 9/2002 | Ito et al. | |
| 6,496,607 B1 | 12/2002 | Krishnamurthy et al. | |
| 6,538,623 B1 | 3/2003 | Pamian et al. | |
| 6,741,165 B1 | 5/2004 | Langfahl et al. | |
| 6,763,071 B1 | 7/2004 | Maeda et al. | |
| 6,785,905 B1 | 8/2004 | Nishioka et al. | |
| 7,081,817 B2 | 7/2006 | Zhevelev et al. | |
| 7,505,673 B2 | 3/2009 | Kreiner et al. | |
| 2001/0043789 A1 | 11/2001 | Nishimura et al. | |
| 2002/0064314 A1 | 5/2002 | Comaniciu et al. | |
| 2002/0069317 A1 | 6/2002 | Chow | |
| 2002/0135679 A1 * | 9/2002 | Scaman | B60R 25/1004 348/148 |
| 2002/0163577 A1 | 11/2002 | Myers | |
| 2002/0191952 A1 | 12/2002 | Fiore et al. | |
| 2003/0054769 A1 * | 3/2003 | Kalluri | H04N 19/172 455/65 |
| 2003/0058341 A1 | 3/2003 | Brodsky et al. | |
| 2003/0109972 A1 | 6/2003 | Tak | |
| 2003/0139909 A1 | 7/2003 | Ozawa | |
| 2003/0154009 A1 * | 8/2003 | Basir | G07C 5/085 701/32.2 |
| 2003/0200017 A1 * | 10/2003 | Capps | H04L 12/12 701/36 |
| 2003/0212567 A1 | 11/2003 | Shintani et al. | |
| 2003/0233185 A1 * | 12/2003 | Takebayashi | F16H 61/061 701/55 |
| 2004/0032493 A1 * | 2/2004 | Franke | B60R 1/00 348/148 |
| 2004/0098184 A1 * | 5/2004 | Ghoneim | B60T 8/17555 701/70 |
| 2005/0021197 A1 | 1/2005 | Zimmerman et al. | |
| 2005/0067429 A1 | 3/2005 | Halbherr | |
| 2005/0068153 A1 | 3/2005 | Lucy et al. | |
| 2005/0068417 A1 | 3/2005 | Kreiner et al. | |
| 2005/0078186 A1 | 4/2005 | Kreiner et al. | |

* cited by examiner

VIDEO RECORDER

CROSS-REFERENCE TO RELATED APPLICATIONS

The present application is a continuation of U.S. application Ser. No. 16/025,926, filed Jul. 2, 2018, which is a continuation of U.S. application Ser. No. 15/941,633, filed Mar. 30, 2018 (now abandoned), which is a continuation of U.S. application Ser. No. 12/632,943, filed Dec. 8, 2009 (now U.S. Pat. No. 9,934,628), which is a continuation of U.S. application Ser. No. 10/674,770, filed Sep. 30, 2003 (now U.S. Pat. No. 7,667,731); the disclosures of each of the above-referenced applications are incorporated by reference herein in their entireties.

This patent application relates to the co-pending and commonly-assigned U.S. application Ser. No. 10/674,840, filed Sep. 30, 2003, and entitled "Video Recorder," of which the "Brief Summary Of The Invention" section and the "Detailed Description of the Invention" section are incorporated herein by reference.

This patent application also relates to the co-pending and commonly-assigned U.S. application Ser. No. 10/674,995, filed Sep. 30, 2003, and entitled "Video Recorder," of which the "Brief Summary Of The Invention" section and the "Detailed Description of the Invention" section are incorporated herein by reference.

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

BACKGROUND OF THE INVENTION

1. Field of the Invention

This invention generally relates to image analysis and, more particularly, to image compression using adaptive coding.

2. Description of the Related Art

Prior art video security systems are not always effective. Whether the prior art video security system utilizes older, analog video cassette tapes, or more recent digital technologies, often times these prior art security systems do not capture important images that help resolve security situations. The older, analog video cassette-based systems, for example, produce hours of usually unimportant video. If a security situation arises, time and resources are squandered while the video tapes are manually reviewed for important information (e.g., the identity of a thief). Even the newer, digital surveillance technologies, using computer intelligence to isolate "important events," often fail to capture information that can resolve security situations. By the time the computer intelligence has determined that something "important" is occurring, revealing information (such as the thief's face) has not been saved. There is, accordingly, a need in the art to capture video/audio data for improved surveillance needs, a need for producing surveillance data that does not require a large amount of time for manual review, and a need for improved recording of video and/or audio data that is compatible with digital technologies.

BRIEF SUMMARY OF THE INVENTION

The aforementioned problems, and other problems, are reduced by a video recorder. This invention provides methods, apparatuses, computer programs, and computer program products for digitally recording video and/or audio data of an event. This invention provides digital storage of visual and aural data for improved quality and for simplified manipulation. Because this invention provides digital storage, the video and/or audio data may be formatted and presented on many different hardware and software systems (e.g., computers, personal digital assistants, cell phones, tablets, and other communications devices). The digital nature of the data may also be communicated in real-time, or near real-time, to monitoring agencies, law enforcement agencies/authorities, and other entities. This invention thus provides a simple, convenient, and effective means of storing and of communicating video and audio data.

The video recorder of this invention can record "backwards in time." That is, this invention provides time-delayed video and audio data. The video recorder stores video and audio data in a loop buffer. The loop buffer stores video and audio data for a predetermined duration or elapse of time. Because the loop buffer stores anywhere from a few seconds to several minutes of video data, the loop buffer, at any one time, provides data from a time recently preceding the recorded event. The loop buffer thus provides both real-time and time-delayed video and audio data of the event captured by the camera. As this patent will further explain, this "time-delayed" video and audio data may be very useful for security and surveillance uses.

This invention discloses methods and apparatuses for recording video data of an event. Some of the apparatuses include a video recorder. A processor communicates with memory. The memory stores video data of the event captured by a camera, and the video data includes a series of picture frames of the event. A loop buffer also stores video data of the event captured by the camera. A rule-based engine stored in the memory uses a set of rules to store the contents of the loop buffer in the memory. The video recorder utilizes the loop buffer to provide video data prior to the occurrence of the event.

Other embodiments of this invention describe a method for recording video data of an event. Here video data of an event is stored, and the video data includes a series of picture frames. The video data of the event is also stored in a loop buffer. A set of rules is applied to transfer the contents of the loop buffer to the memory, wherein the method provides video data prior to occurrence of the event.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE SEVERAL VIEWS OF THE DRAWINGS

These and other features, aspects, and advantages of the embodiments of the present invention are better understood when the following Detailed Description of the Invention is read with reference to the accompanying drawings, wherein.

DETAILED DESCRIPTION OF THE INVENTION

This invention now will be described more fully hereinafter with reference to the accompanying drawings, in which exemplary embodiments are shown. This invention may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named manufacturer.

Figure 1:
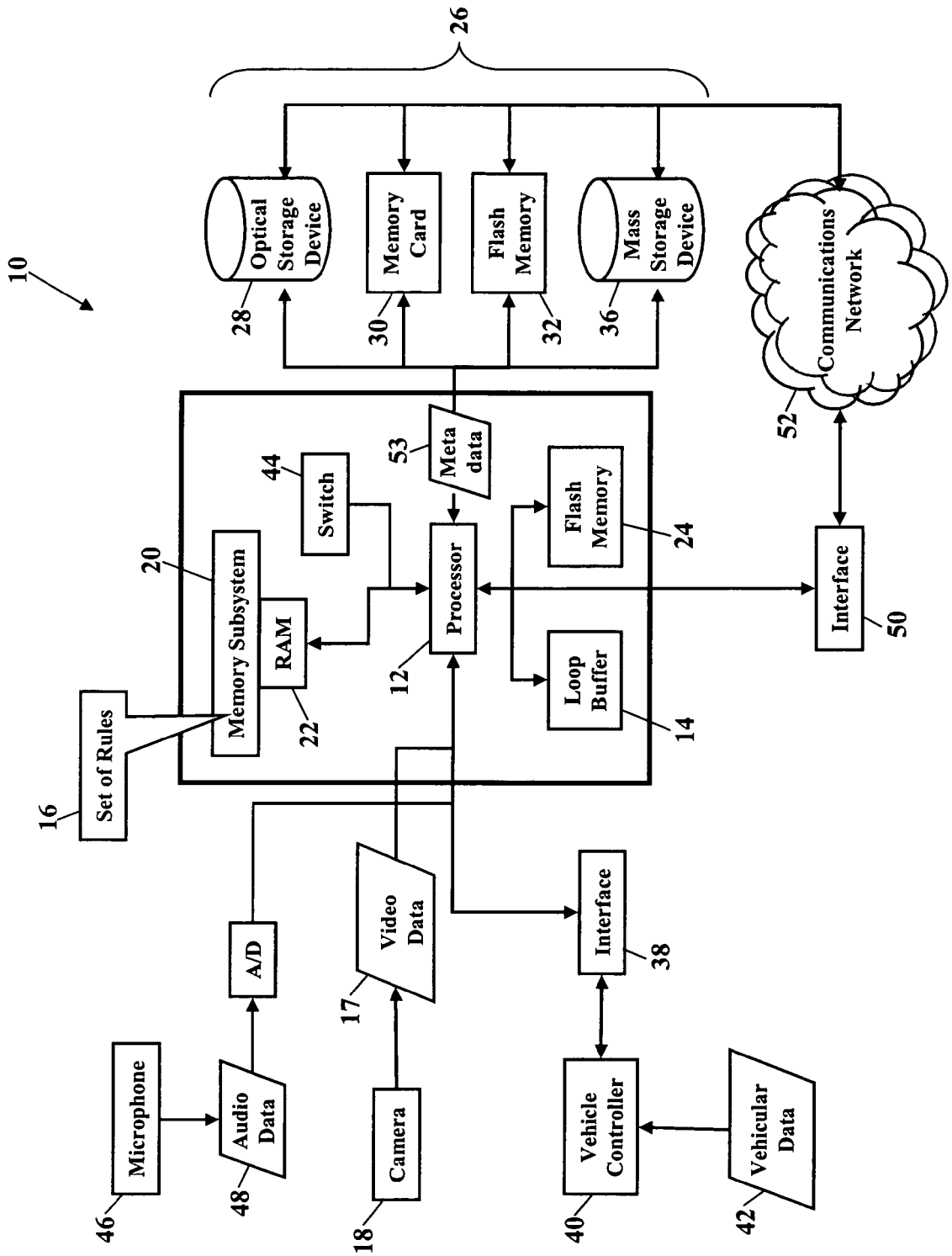
FIG. 1 is a schematic illustrating a video recorder according to embodiments of this invention.

FIG. 1 is a schematic illustrating a video recorder 10 according to embodiments of this invention. This invention provides methods, apparatuses, computer programs, and computer program products for recording video and/or audio data of an event. This invention provides digital storage of visual and aural data for improved quality and for simplified manipulation. Because this invention provides digital storage, the video and/or audio data may be formatted and presented on many different hardware and software systems (e.g., computers, personal digital assistants, cell phones, tablets, and other communications devices). The digital nature of the data may also be communicated in near real time to monitoring agencies, law enforcement agencies/authorities, and other entities. This invention thus provides a simple, convenient, and effective means of storing and of communicating video and audio data.

The video recorder 10 of this invention also provides time-delayed video and audio data. The video recorder 10 stores video and audio data in a loop buffer 14. The loop buffer 14 stores video and audio data for a predetermined duration or elapse of time. Because the loop buffer 14 stores anywhere from a few seconds to several minutes of video data, the loop buffer 14, at any one time, provides data from a time recently preceding the recorded event. The loop buffer 14 thus provides both real-time and time-delayed video and audio data of the event captured by the camera. As this patent will further explain, this "time-delayed" video and audio data may be very useful for security and surveillance uses.

Those of ordinary skill in the art of computer programming will recognize computer processes/programs are depicted as process and symbolic representations of computer operations. Computer components, such as a central processor, memory devices, and display devices, execute these computer operations. The computer operations include manipulation of data bits by the central processor, and the memory devices maintain the data bits in data structures. The process and symbolic representations are understood, by those skilled in the art of computer programming, to convey the discoveries in the art.

FIG. 1 is a simplified componentry schematic of the video recorder 10. The video recorder 10 includes at least one processor 12, a loop buffer 14, and a set 16 of rules. The video recorder 10 stores video data 17 of an event captured by at least one camera 18. The video data 17 includes a series of picture frames. When this series of picture frames are sequentially reviewed, the video data 17 resembles a motion picture of the event. The video recorder 10 stores the video data 17 in one or more memory devices. The memory devices include a memory subsystem 20 (such as RAM memory 22), flash memory 24, and/or a peripheral storage device 26. The peripheral storage device 26 could include an optical storage device 28, a memory card 30, a removable flash memory storage device 32, or a mass-storage device 36. The peripheral storage device 26 could also include a magnetic storage device (not shown) for storing the video data of the event. As the at least one camera 18 captures and sends video data 17 of the event, the video recorder 10 stores the frames of the video data 17 in one or more of the memory devices.

The video recorder 10 also includes the loop buffer 14. The loop buffer 14 also stores video data 17 of the event captured by the at least one camera 18. The loop buffer 14, however, provides time-delayed video data of the event. As those of ordinary skill in the art understand, the loop buffer 14 stores the video data 17 for a predetermined duration or elapse of time (typically from a few seconds to several minutes). This video data 17 is stored in a plurality of data registers. These data registers are coupled in series, such that an output of the first register is coupled to an input of the next register in the series. The video data 17 thus shuttles from one register to the next register, thus providing time to execute logical instructions concerning the video data. When the video data 17 reaches the last register in the series, the video data must either be saved/transferred to a more permanent memory device, or the video data must be discarded. Because the loop buffer 14 stores anywhere from a few seconds to several minutes of video data, the loop buffer 14 provides video data from a time recently preceding the recorded event. As this patent will further explain, this "time-delayed" video data may be very useful for security and surveillance uses. Because, however, the operational and architectural concepts of loop buffers are known, this patent will not further describe the loop buffer 14. If the reader desires a more detailed explanation of loop buffers, the reader is invited to consult U.S. Pat. No. 6,598,155 to Ganapathy et al. (Jul. 22, 2003), of which the "Detailed Description of the Preferred Embodiment" section is incorporated herein by reference.

The video recorder 10 also includes the set 16 of rules. The set 16 of rules determines when to transfer the contents of the loop buffer 14 into one or more of the memory devices. The set 16 of rules are logical rules, and each rule describes an event, occurrence, or detection that causes the contents of the loop buffer 14 to be transferred into one or more of the memory devices. The set 16 of rules is shown residing in the memory subsystem 20. The set 16 of rules, however, could also additionally or alternatively reside in the flash memory 24 and/or any of the peripheral storage devices 26 (e.g., the optical storage device 28, the memory card 30, the removable flash memory storage device 32, and/or the mass-storage device 36). When the set 16 of rules determines to transfer the contents of the loop buffer 14 into one or more of the memory devices, the memory devices then store time-delayed video data. This time-delayed video data precedes the event, occurrence, or detection that triggered the transfer. The contents of the loop buffer 14 thus contain video data that precedes the event, occurrence, or detection.

The video recorder 10 may be very useful for mobile transportation uses. If the video recorder 10 is installed in, or monitors, a vehicle (such as an automobile or a tractor-trailer), the time-delayed video data may be useful for security and for surveillance uses. The at least one camera 18, for example, could be oriented to view an interior and/or an exterior of the vehicle. The video recorder 10 stores video data 17 from the at least one camera 18 in one or more of the memory devices (e.g., 20, 22, 24, 26, 28, 30, 32, and/or 36). The video recorder 10 also stores video data 17 from the at least one camera 18 in the loop buffer 14. The contents of the loop buffer 14 would contain video data that precedes the event, occurrence, or detection. The set 16 of rules define various events, occurrences, or detections that cause the contents of the loop buffer 14 to be transferred into one or more of the memory devices. Because the contents of the loop buffer 14 contain video data that precedes the event, occurrence, or detection, the contents of the loop buffer 14 may help identify a thief, determine fault in an accident, or document a component failure.

As FIG. 1 shows, the video recorder 10 could include an interface 38 with a vehicle controller 40. Many vehicles and/or vehicle manufacturers use one or more controllers/computers to control performance of an automobile's engine, transmission, powertrain, electrical, chassis, and HVAC components. Sensors, switches, and actuators provide data to these controllers, and these controllers use this data to control emissions devices, cooling fans, ignition, air/fuel ratios, and many other performance variables. The vehicle controller 40 receives vehicular data 42, and the set 16 of rules specifies what vehicular data 42 causes a transfer of the contents of the loop buffer 14 into one or more of the memory devices (e.g., 20, 22, 24, 26, 28, 30, 32, and/or 36). This vehicular data 42 may include engine or powertrain management system information from an engine, electric motor, or transmission system of the vehicle. The vehicular data 42 may also include electrical management system information from an electrical system of the vehicle. The vehicular data 42 may also include chassis management system information from a chassis system of the vehicle.

The term "vehicular data," as used herein, can be any signals or information used by the engine or powertrain management system. The vehicular data 42 may include any of the sensor, switch, or actuator data collected by the engine or powertrain management system. Those of ordinary skill in the art recognize there are many sensors, switches, and actuators used in automobiles, and the number of sensors, switches, and actuators grows each model year. The vehicular data may include, for example, air intake temperature sensors, engine coolant sensors, throttle position sensors, manifold air pressure sensors, oxygen sensors, mass air flow sensors, ignition sensors, knock sensor, EGR sensors, and many other sensors. The set 16 of rules could specify what signals, information, and other vehicular data are used to transfer the contents of the loop buffer 14 into one or more of the memory devices (e.g., 20, 22, 24, 26, 28, 30, 32, and/or 36). Because the contents of the loop buffer 14 contain video data that precedes the event, occurrence, or detection, the contents of the loop buffer 14 may help identify a thief, determine fault in an accident, or document a component failure.

The term "vehicular data" may also include any error codes flagged by the engine or powertrain management system. Sensors, switches, and actuators, as mentioned above, provide data to one or more on-board controllers/computers. These controllers/computers use this data to control emissions devices, cooling fans, ignition, air/fuel ratios, and many other components and performance variables. When these controllers/computers detect sensor inputs, or other inputs, that are outside of programmed limits, the controllers/computers often set an error code. The set 16 of rules could specify what error codes, signals, information, and other vehicular data are used to trigger a transfer the contents of the loop buffer 14 into one or more of the memory devices. Because the loop buffer 14 contains video data that precedes the transfer, the contents of the video buffer 14 may help determine what caused the error code.

The term "vehicular data" may also include electrical management system information. The electrical management system information includes information used to control the vehicle's electrical system. Sensors, switches, and actuators provide data to one or more on-board controllers/computers, and these controllers/computers use this data to detect under and over voltage or current conditions, open circuit conditions, circuit failures, power failures, battery failures, and many other electrical system concerns. The set 16 of rules could specify what electrical management system information and other vehicular data are used to trigger a transfer of the contents of the loop buffer 14 into one or more of the memory devices. Because the loop buffer 14 contains video data that precedes the transfer, the contents of the video buffer 14 may document any recently preceding event.

The term "vehicular data" may also include chassis management system information. Today's vehicles are increasingly using one or more controllers/computers to control advanced chassis/suspension components. Hydraulic and/or pneumatic leveling systems, adaptive/active suspension systems, magneto-rheological suspension components, electric steering systems, and four wheel steering systems are just a few of the technological advances in chassis design. These chassis advances use one or more controllers/computers to control these systems. Steering wheel angle sensors, yaw, pitch, and roll accelerometer sensors, height sensors, shock absorber valving sensors, and many other chassis sensors, switches, and actuators are used to detect the state of the chassis system. The set 16 of rules could specify what chassis management system information and other vehicular data 42 are used to trigger a transfer of the contents of the loop buffer 14 into one or more of the memory devices. Because the loop buffer 14 contains video data that precedes the transfer, the contents of the video buffer 14 may document any recently preceding event.

The video recorder 10 of this invention, as mentioned above, is useful for security and for surveillance uses. The set 16 of rules specifies the conditions, events, errors, or signals that trigger a transfer of the contents of the loop buffer 14. When the set 16 of rules triggers a transfer of the contents of the loop buffer 14, the video data may be useful in identifying a thief, determining fault in an accident, or documenting a component failure. The vehicle controller 40, for example, may detect movement of a door latch. If this movement, however, is not accompanied by digital authorization from a wireless key fob, the movement may indicate an attempted vehicle theft. The set 16 of rules, then, could specify that when door latch movement is detected, yet unaccompanied by digital authorization from a wireless key fob, the contents of the loop buffer 14 should be transferred to a more permanent memory device (e.g., 20, 22, 24, 26, 28, 30, 32, and/or 36). The video data 17 captured by the at least one camera 18 may help identify the potential thief.

The video recorder 10 of this invention could also help determine fault in an accident. The vehicle controller 40 may detect accelerometer sensor data, detonation, or other indicator of an airbag deployment. The set 16 of rules could specify that when the airbag is deployed, the contents of the loop buffer 14 should be transferred to one or more of the memory devices (e.g., 20, 22, 24, 26, 28, 30, 32, and/or 36). The video data 17 captured by the at least one camera 18 may thus help determine from what direction the vehicle was heading, the climatic and road conditions, the surrounding traffic situation, and, ultimately, who was a fault.

The video recorder 10 may similarly help resolve product liability issues. When product liability cases are brought against a manufacturer, causation is often debated—was the accident caused by operator error or by component failure? The video recorder 10 of this invention may help resolve causation and other product liability issues. The vehicle controller 40, for example, may detect unusually high accelerometer data. This unusually high accelerometer data may indicate full jounce/rebound movement of a suspension component and/or excessive yaw, pitch, or roll movement. The set 16 of rules could specify that when unusually high accelerometer data is detected, the contents of the loop buffer 14 should be transferred to one or more of the memory devices (e.g., 20, 22, 24, 26, 28, 30, 32, and/or 36). The video data 17 captured by the at least one camera 18 may then help determine whether a suspension component failed and caused the vehicle to rollover, or whether the operator drove onto the curb and caused the vehicle to flip.

The video recorder 10 also includes a switch 44. The switch 44 may be used to manually trigger a transfer of the contents of the loop buffer 14 into one or more of the memory devices. The switch 44 could be placed in proximity to the operator of the vehicle or in proximity to a passenger. When the driver or the passenger witnesses an event worthy of more permanent storage, the driver and/or passenger can depress/toggle/activate the switch 44. The driver, for example, may witness an accident, drunken driver, altercation, or rare moment. The set 16 of rules could specify that when the switch 44 is activated, the contents of the loop buffer 14 should be transferred to one or more of the memory devices (e.g., 20, 22, 24, 26, 28, 30, 32, and/or 36). The video data 17 captured by the at least one camera 18 may then document from a time preceding the accident, drunken driver, altercation, or other moment.

The video recorder 10 may also include a microphone 46. The microphone 46 provides audio data 48 of the event. This audio data 48 may also be stored in the loop buffer 14. When the set 16 of rules specifies, the audio data 48 is transferred to one or more of the memory devices (e.g., 20, 22, 24, 26, 28, 30, 32, and/or 36). The term "microphone" includes any means for transferring sound/pressure into electrical signals.

The video recorder 10 may also include an interface 50 to a communications network 52. This interface 50 allows the video recorder 10 to transfer the contents of the loop buffer 14 to a remote location. The interface 50 could include a physical connection (e.g., a wire, optical fiber, or cable connection) to the communications network 52. The interface 50, however, may also utilize a wireless protocol to a wireless communications network. Wireless networks, such as those utilizing the I.E.E.E. 802 family of wireless standards, could be used to transfer the contents of the loop buffer 14 to one or more remote memory locations. The video recorder 10, for example, could transfer the contents of the loop buffer 14 to any of the peripheral storage devices 26 (e.g., the optical storage device 28, the memory card 30, the removable flash memory storage device 32, and/or the mass-storage device 36) via the wireless interface 50 to the communications network 52. When the video recorder 10 comes within range of a wireless network (e.g., a "Wi-Fi" network), the set 16 of rules could specify that the contents of the loop buffer 14 be wirelessly transferred to any of the peripheral storage devices 26.

The video recorder 10 may also tag the video data 17 with metadata 53. The term "metadata" describes any data, description, narration, or explanation of other data. Here the set 16 of rules video recorder 10 may add, append, supplement, or tag the video data 17 with metadata. The metadata 53 may be any information, such as a description of a rule that caused the contents of the loop buffer 14 to be transferred to at least one of the memory devices 20, 22, 24, 26, 28, 30, 32, and/or 36.

Figure 2:
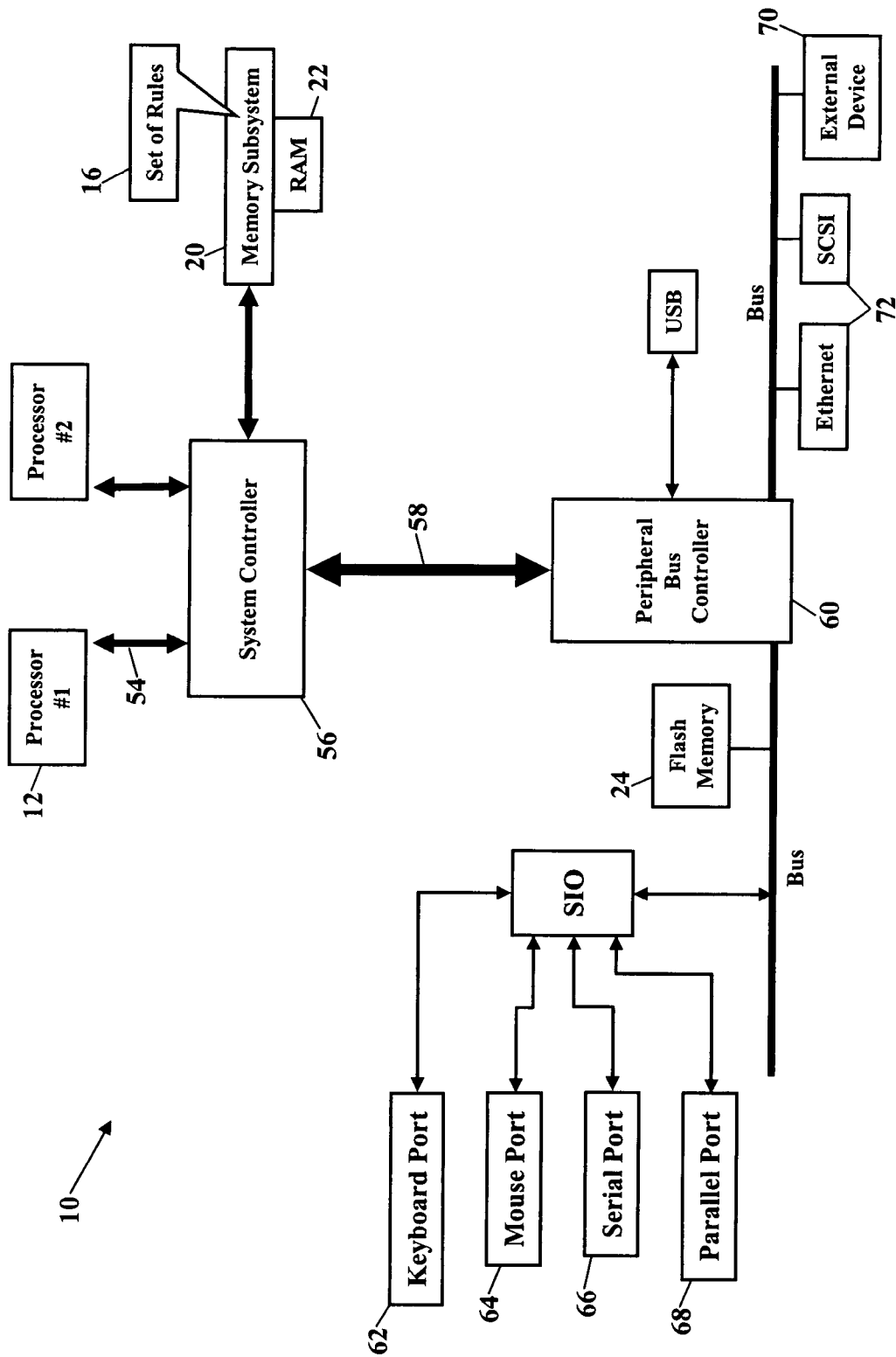
FIG. 2 is a more detailed schematic of the video recorder shown in FIG. 1.

FIG. 2 is a more detailed schematic of the video recorder 10. The video recorder 10 includes the one or more processors 12 executing an operating system. The operating system, as is well known, has a set of instructions that control the internal functions of the processors 12 and of other components. A system bus 54 communicates signals, such as data signals, control signals, and address signals, between the processor 12 and a system controller 56 (typically called a "Northbridge"). The system controller 56 provides a bridging function between the one or more processors 12, the memory subsystem 20, and a PCI (Peripheral Controller Interface) bus 58. The PCI bus 58 is controlled by a Peripheral Bus Controller 60. The Peripheral Bus Controller 60 (typically called a "Southbridge") is an integrated circuit that serves as an input/output hub for various peripheral ports. These peripheral ports could include, for example, a keyboard port 62, a mouse port 64, a serial port 66 and/or a parallel port 68 for a video display unit, one or more external device ports 70, and networking ports 72 (such as SCSI or Ethernet). Those of ordinary skill in the art understand that the program, processes, methods, and systems described in this patent are not limited to any particular computer system or computer hardware.

Those of ordinary skill in the art also understand the at least one processor 12 is typically a microprocessor. Advanced Micro Devices, Inc., for example, manufactures a full line of ATHLON™ microprocessors (ATHLON™ is a trademark of Advanced Micro Devices, Inc., One AMD Place, P.O. Box 3453, Sunnyvale, Calif. 94088-3453, 408.732.2400, 800.538.8450, www.amd.com). The Intel Corporation also manufactures a family of X86 and P86 microprocessors (Intel Corporation, 2200 Mission College Blvd., Santa Clara, Calif. 95052-8119, 408.765.8080, www.intel.com). Other manufacturers also offer microprocessors. Such other manufacturers include Motorola, Inc. (1303 East Algonquin Road, P.O. Box A3309 Schaumburg, Ill. 60196, www.Motorola.com), International Business Machines Corp. (New Orchard Road, Armonk, N.Y. 10504, (914) 499-1900, www.ibm.com), and Transmeta Corp. (3940 Freedom Circle, Santa Clara, Calif. 95054, www.transmeta.com). Those skilled in the art further understand that the program, processes, methods, and systems described in this patent are not limited to any particular manufacturer's central processor.

The preferred operating system is the UNIX® operating system (UNIX® is a registered trademark of the Open Source Group, www.opensource.org). Other UNIX-based operating systems, however, are also suitable, such as LINUX® or a RED HAT® LINUX-based system (LINUX® is a registered trademark of Linus Torvalds, and RED HAT® is a registered trademark of Red Hat, Inc., Research Triangle Park, N.C., 1-888-733-4281, www.redhat.com). Other operating systems, however, are also suitable. Such other operating systems would include a WINDOWS-based operating system (WINDOWS® is a registered trademark of Microsoft Corporation, One Microsoft Way, Redmond Wash. 98052-6399, 425.882.8080, www.Microsoft.com). and Mac® OS (Mac® is a registered trademark of Apple Computer, Inc., 1 Infinite Loop, Cupertino, Calif. 95014, 408.996.1010, www.apple.com). Those of ordinary skill in the art again understand that the program, processes, methods, and systems described in this patent are not limited to any particular operating system.

The memory devices (shown as reference numerals 20, 22, 24, 26, 28, 30, 32, and/or 36 in FIGS. 1 and 2) may also contain an application program. The application program cooperates with the operating system and with a video display unit (via the serial port 66 and/or the parallel port 68) to provide a Graphical User Interface (GUI). The Graphical User Interface typically includes a combination of signals communicated along the keyboard port 62 and the mouse port 64. The Graphical User Interface provides a convenient visual and/or audible interface with a user of the video recorder 10.

The video recorder 10 may include other componentry. The video recorder 10, for example, may include a video digitizer. This video digitizer would convert analog video data from the at least one camera (shown as reference numeral 18 in FIG. 1) to digital video data. The video recorder 10 may also include video encoding software. This video encoding software is also stored in at least one of the memory devices (shown as reference numerals 20, 22, 24, 26, 28, 30, 32, and/or 36 in FIGS. 1 and 2), and the video encoding software formats the video data transferred from the loop buffer 14. The video data, for example, may be formatted according to an MPEG standard or any other standard. The video recorder 10 may also include encryption software for encrypting the video/audio data before storing in at least one of the memory devices. Encryption may be desirable before remotely storing the video data via the communications network 52.

Figure 3:
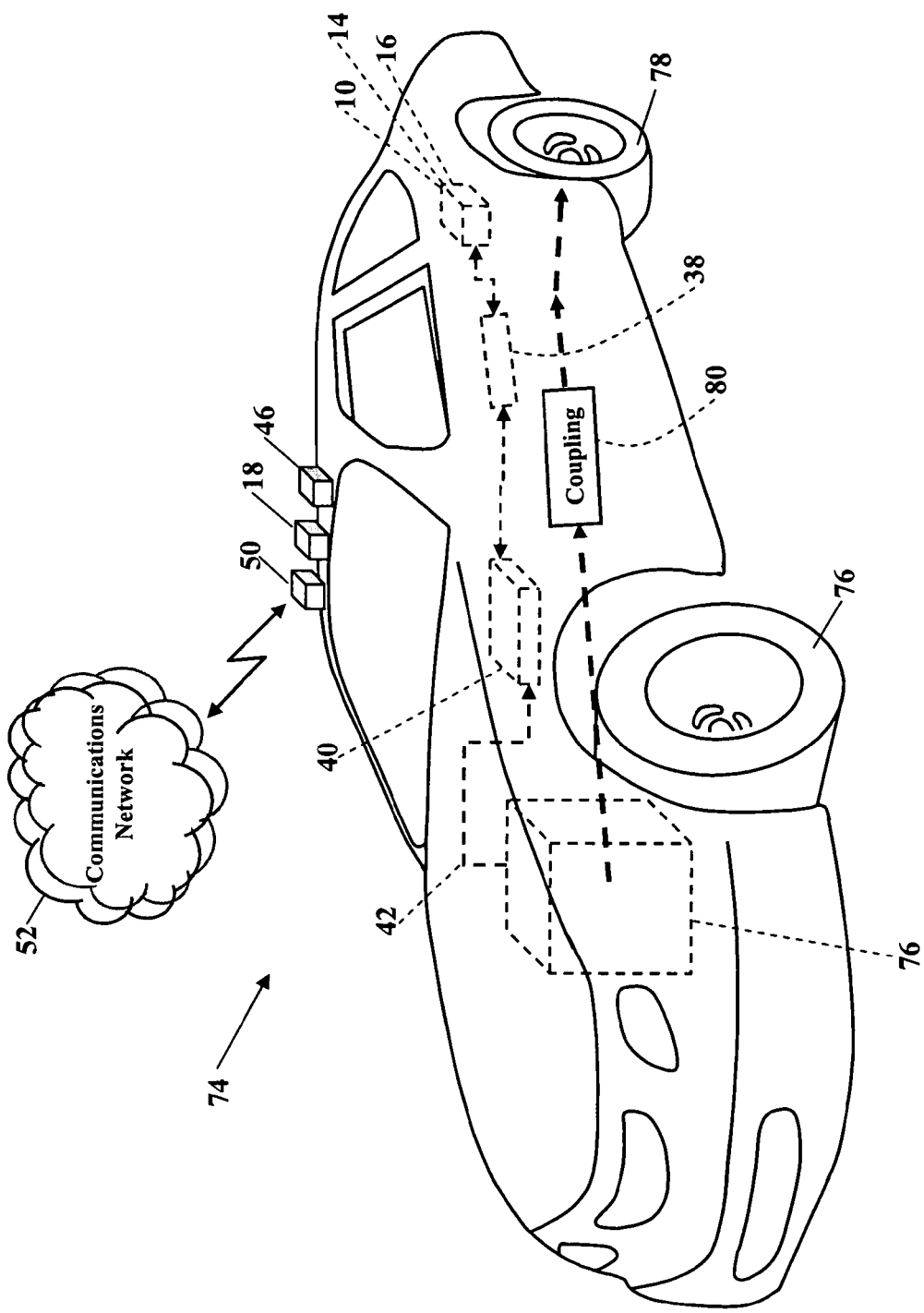
FIG. 3 is a schematic of a vehicle incorporating the video recorder shown in FIGS. 1 and 2.

FIG. 3 is a schematic of a vehicle 74 incorporating the video recorder 10. The vehicle 74 includes a powertrain system 76 driving at least one wheel and tire assembly 76. The powertrain system 76 typically includes an internal combustion engine coupled to a transmission, and the transmission couples to the at least one wheel and tire assembly 76. The powertrain system 76, however, may additionally or alternatively include an electric motor driving the at least one wheel and tire assembly 76. The powertrain system 76 additionally or alternatively may include fuel cell device. Because the powertrain system 76 may have many different configurations, FIG. 3 schematically represents the powertrain system 76 as a generic block. Although the powertrain system 76 may have a front-wheel drive configuration, a rear-wheel drive configuration, or an all-wheel drive configuration, FIG. 3 shows the powertrain system 76 coupled to a rear wheel 78. This coupling between the powertrain system 76 and the rear wheel 78 is shown as a dotted line arrow labeled "Coupling" (shown as reference numeral 80).

FIG. 3 also shows the vehicle controller 40. The vehicle controller 40 receives the vehicular data 42 from the powertrain system 76. Although not shown in FIG. 3, the vehicle controller 40 may additionally or alternatively receive the vehicular data 42 from a chassis component, sensor, or controller and/or an electrical system component, sensor, or controller. The interface 38 between the video recorder 10 and the vehicle controller 40 allows the video recorder 10 to make decisions based upon the vehicular data 42.

The video recorder 10, as mentioned above, stores video data of an event. The video recorder 10 receives the video data and/or the audio data (shown, respectively, as reference numerals 17 and 48 in FIG. 1) from the at least one camera 18 and from the microphone 46. When the set 16 of rules specifies, the video recorder 10 transfers the contents of the loop buffer 14 to at least one of the memory devices (shown as reference numerals 20, 22, 24, 26, 28, 30, 32, and/or 36 in FIGS. 1 and 2). The video recorder 10 may utilize the wireless interface 50 to transfer the contents of the loop buffer 14 to one or more remote memory locations via the communications network 52. The contents of the loop buffer 14 may then be used to view video and audio data recently preceding an event.

Figure 4:
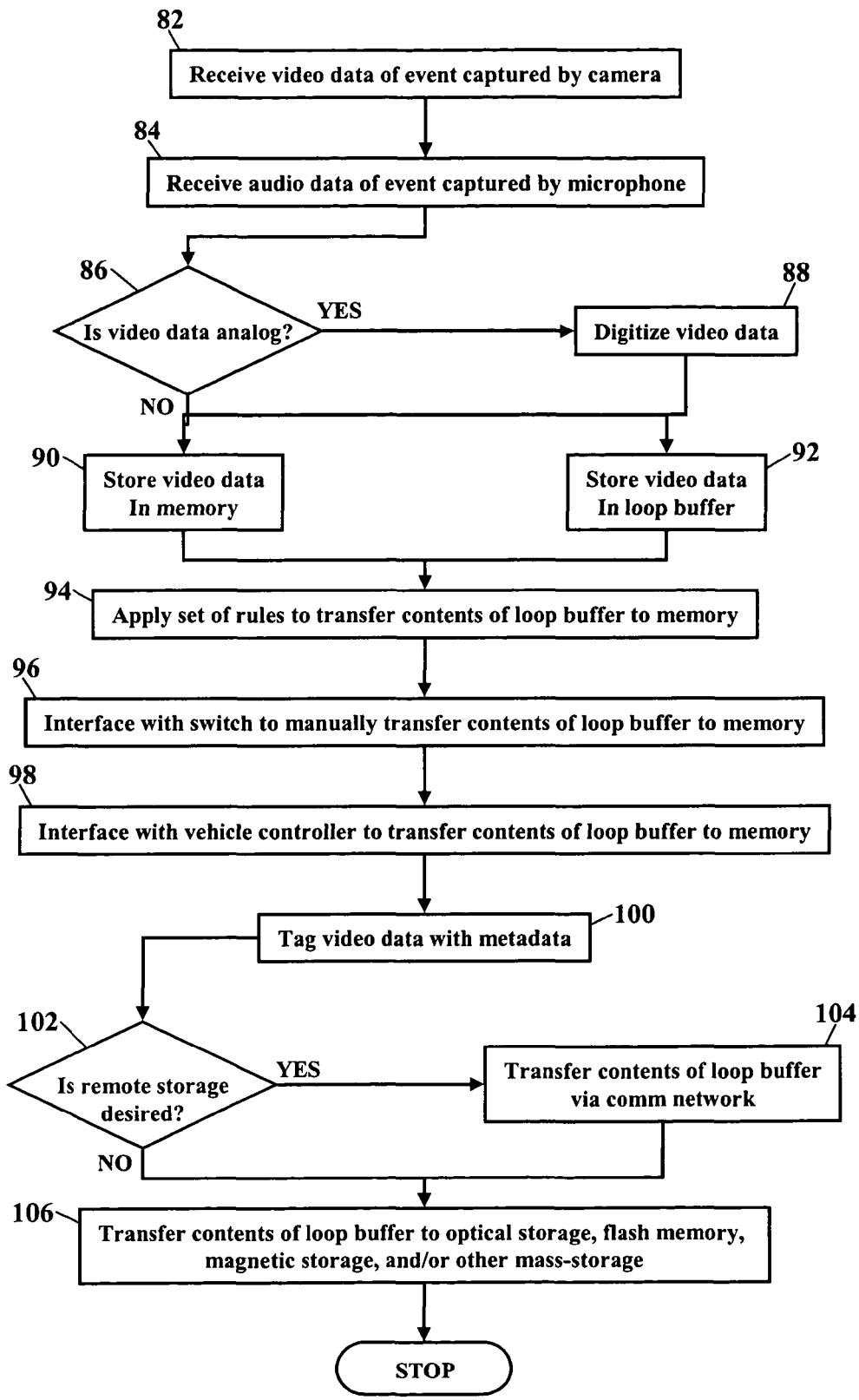
FIG. 4 is a flowchart illustrating a method for recording video data of an event.

FIG. 4 is a flowchart illustrating a method for recording video data of an event. Video data of an event, captured by a camera, is received at a video recorder (Block 82). The video data includes a series of picture frames. The video recorder may also receive audio data of the event captured by a microphone (Block 84). If the video is in an analog form (Block 86), the video is digitized (Block 88). The video data is stored in memory (Block 90) and stored in a loop buffer (Block 92). A set of rules is applied to transfer the contents of the loop buffer to the memory (Block 94). The video recorder may also interface with a switch to manually transfer the contents of the loop buffer to the memory (Block 96). The video recorder may also interface with a vehicle controller to transfer the contents of the loop buffer to the memory (Block 98). The video recorder may tag the video data with metadata (Block 100). The metadata provides a description of a rule that caused the contents of the loop buffer to be transferred to the memory. If remote storage is desired or required (Block 102), the contents of the loop buffer are transferred via a communications network (Block 104). The contents of the loop buffer may be transferred to an optical storage device, a flash memory storage device, a magnetic storage device, and/or another mass-storage device (Block 106).

The set 16 of rules may be physically embodied on or in a computer-readable medium. This computer-readable medium may include CD-ROM, DVD, tape, cassette, floppy disk, memory card, and large-capacity disk (such as IOMEGA®, ZIP®, JAZZ®, and other large-capacity memory products (IOMEGA®, ZIP®, and JAZZ® are registered trademarks of Iomega Corporation, 1821 W. Iomega Way, Roy, Utah 84067, 801.332.1000, www.iomega.com).

This computer-readable medium, or media, could be distributed to end-users, licensees, and assignees. These types of computer-readable media, and other types not mention here but considered within the scope of the present invention, allow the set 16 of rules to be easily disseminated. A computer program product for transferring video and/or audio data from a video recorder to memory comprises the computer-readable medium and the set 16 of rules. The set 16 of rules is stored on the computer-readable medium.

The set 16 of rules may also be physically embodied on or in any addressable (e.g., HTTP, I.E.E.E. 802.11, Wireless Application Protocol (WAP)) wireless device capable of presenting an IP address. Examples could include a computer, a wireless personal digital assistant (PDA), an Internet Protocol mobile phone, or a wireless pager.

While the present invention has been described with respect to various features, aspects, and embodiments, those skilled and unskilled in the art will recognize the invention is not so limited. Other variations, modifications, and alternative embodiments may be made without departing from the spirit and scope of the present invention.

What is claimed is:

1. A system, comprising:
 a processor;
 a buffer in communication with the processor;
 a camera configured to capture video data associated with a vehicle;
 an accelerometer configured to collect accelerometer data;
 a first memory having program instructions stored therein that are executable by the processor to cause the system to perform operations including:
  storing the video data in the buffer; and
  in response to a triggering event, transferring the stored video data from the buffer to a second memory in the vehicle, wherein the triggering event is an occurrence of the accelerometer data exceeding a threshold and indicating one or both of (a) full jounce or rebound of a suspension component or (b) excessive yaw, pitch, or roll movement of the vehicle; and
 an interface capable of transferring the video data from at least one of the camera, the buffer, or the second memory to a portable device.

2. The system of claim 1, further comprising:
 a microphone configured to capture audio data;
 wherein the operations further include:
  storing the audio data in the buffer; and
  in response to the triggering event, transferring the stored audio from the buffer to a remote device via the interface.

3. The system of claim 1, wherein the camera is a first camera oriented to view outside the vehicle; and
 wherein the system further comprises:
  a second camera oriented to view inside the vehicle, wherein the stored video data includes video data from the second camera.

4. The system of claim 1, wherein the operations further include:
 receiving vehicular data from one or more sensors in the vehicle.

5. The system of claim 4, wherein the vehicular data includes data received from one or both of an engine management system or a powertrain management system included in the vehicle.

6. The system of claim 4, wherein the vehicular data includes data received from a throttle position sensor.

7. The system of claim 4, wherein the vehicular data includes data received from an electrical management system of the vehicle.

8. The system of claim 7, wherein the vehicular data is used to detect one or more of an under or over voltage or current condition, an open circuit condition, a circuit failure, a power failure, or a battery failure.

9. The system of claim 4, wherein the vehicular data includes data received from an ignition system of the vehicle.

10. The system of claim 1, further comprising:
 a switch operable by a user to trigger transferring the stored video data from the buffer to the second memory in the vehicle.

11. The system of claim 1, wherein the second memory includes a removable memory storage device.

12. The system of claim 1, wherein the portable device is a cellular phone.

13. A system, comprising:
 a processor;
 an accelerometer configured to collect accelerometer data associated with a vehicle; and
 memory having program instructions stored therein that are executable by the processor to cause the system to perform operations including:
  receiving video data from a camera;
  sending the received video data to a first storage to be stored as time-delayed video data; and
  in response to a triggering event, transferring the time-delayed video data from the first storage to a different storage, wherein the triggering event is an occurrence of the accelerometer data exceeding a threshold corresponding to a yaw, pitch, or roll movement of the vehicle exceeding one or more predetermined amounts; and
 an interface capable of allowing transfer of the stored video data from the first storage or the different storage to a portable device.

14. The system of claim 13, wherein the different storage is at least one of a memory subsystem or a flash memory in the vehicle.

15. The system of claim 13, wherein the different storage is a remote device, and wherein the transferring is via the interface.

16. The system of claim 13, wherein the operations further include:
 receiving vehicular data from one or more sensors in the vehicle.

17. A method, comprising:
 storing, in a buffer of a system, video data captured by a camera associated with a vehicle;
 collecting accelerometer data from an accelerometer installed in the vehicle;
 transferring, in response to an occurrence of the accelerometer data exceeding one or both of (a) a full jounce or rebound threshold for a suspension component or (b) a yaw-, pitch-, or roll-movement threshold for the vehicle, the stored video data from the buffer to a memory;
 receiving, at the system, a user command; and
 transferring, in response to the user command, the video data from at least one of the buffer or the memory to a portable device via a wireless interface.

18. The method of claim 17, further comprising:
 storing, in the buffer, audio data captured by a microphone;

transferring, in response to the occurrence of the accelerometer data exceeding one or both thresholds, the stored audio from the buffer to the memory; and transferring, in response to the user command, the audio data from at least one of the buffer or the memory to the portable device via the interface.

19. The method of claim 17, further comprising:

transferring, in response to the occurrence of the accelerometer data exceeding one or both thresholds, the stored video data from the buffer to a remote device via the interface.

20. The method of claim 17, further comprising:

receiving, by the system, vehicular data from one or more sensors of the vehicle, wherein the one or more sensors include an air temperature sensor of the vehicle.

* * * * *